May 13, 1930. O. LUHR Re. 17,660
REFRIGERATOR CAR
Original Filed May 10, 1926 3 Sheets-Sheet 1
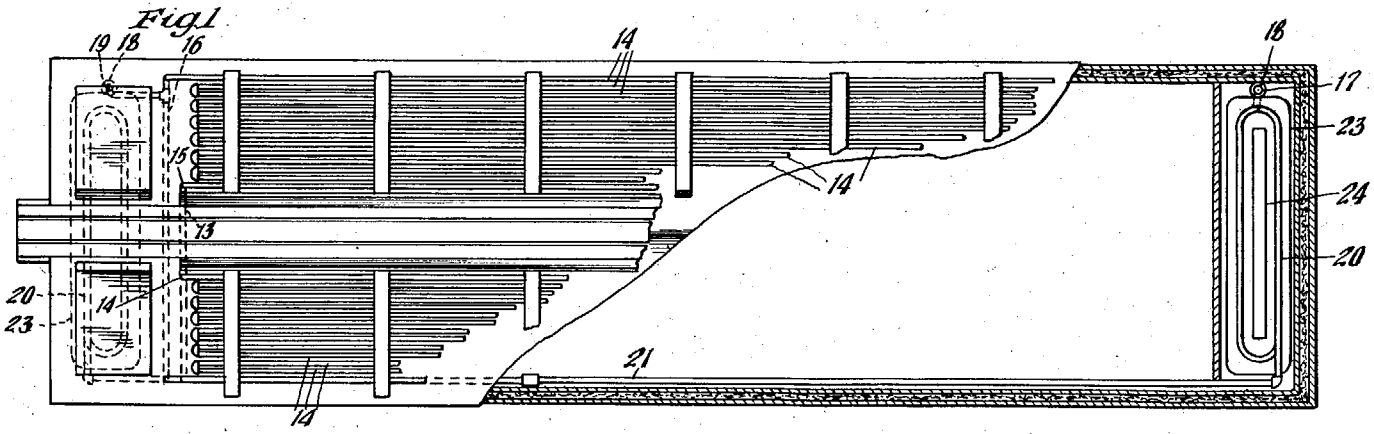
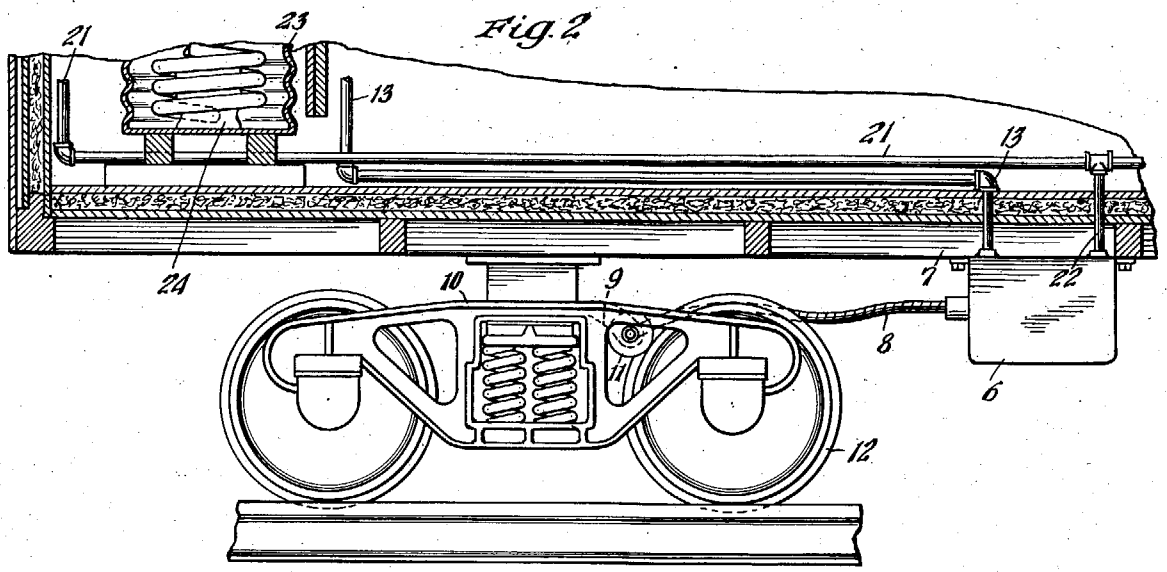
Inventor
Otto Luhr
By Joseph Harris
His Atty.

May 13, 1930. O. LUHR Re. 17,660

REFRIGERATOR CAR

Original Filed May 10, 1926 3 Sheets-Sheet 2

Inventor
Otto Luhr

By Joseph Harris
His Atty.

May 13, 1930. O. LUHR Re. 17,660

REFRIGERATOR CAR

Original Filed May 10, 1926 3 Sheets-Sheet 3

Inventor
Otto Luhr
By Joseph Harris
His Attg.

Reissued May 13, 1930 Re. 17,660

UNITED STATES PATENT OFFICE

OTTO LUHR, OF CHICAGO, ILLINOIS

REFRIGERATOR CAR

Original No 1,642,882, dated September 20, 1927, Serial No. 107,944, filed May 10, 1926. Application for reissue filed December 11, 1929. Serial No. 413,206.

This invention relates to railroad cars, and more especially to cars commonly known as refrigerator cars.

The object of the invention is to provide a car having a refrigerating mechanism attached thereto and adapted to keep the temperature in the car substantially at a predetermined degree of temperature whether the car be in transit or at a standstill.

Another object of the invention is to provide a refrigerator car having a suitable compressor attached thereto on any suitable place on the car, for instance on the underside of the underframe of the car.

A further object of the invention is to provide a refrigerator car, the bulkheads whereof containing the refrigerating coils will occupy a relatively small space, leaving ample room for the freight to be loaded in the car.

Another object of the invention is to provide a car having condenser coils or pipes arranged on the outside of the car, preferably on top of the car, whereby the heat absorbed by the refrigerating medium may be carried off by the draft produced by the movement of the car.

A still further object of the invention is to provide a refrigerator car, the compressor whereof is driven directly by one of the car wheels or car axles.

Another object of the invention is to provide a refrigerator car, wherein the driving mechanism for the compressor is constantly in operative relation, with one of the wheels or axles of the car, regardless if the car travels on a straight track or on a curve.

Other objects of the invention not specifically mentioned will be evident from the following specification.

The accompanying drawings show an embodiment of the invention. It is however to be understood that the invention is not to be limited to the exact construction shown in said drawings and described in said specification, but that changes may be made as long as said changes fall inside the scope of the claims appended hereto.

Figure 5:
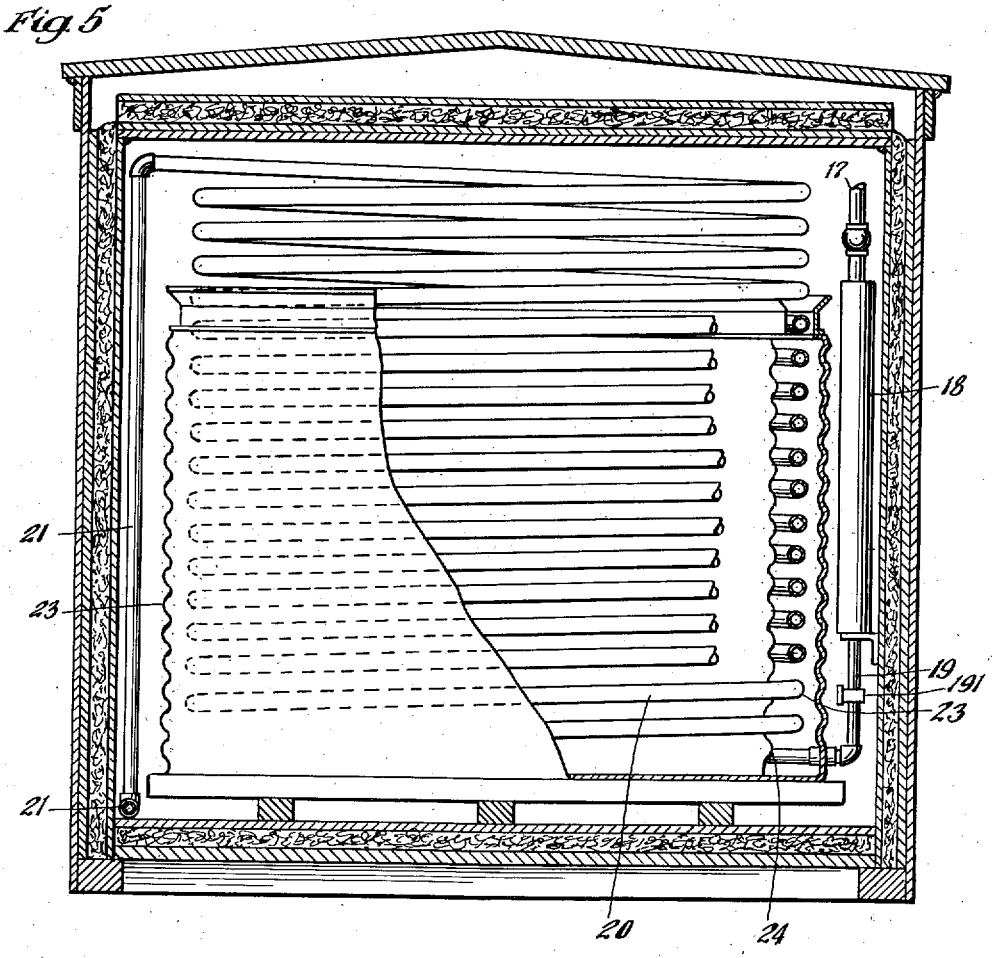
Figure 6:
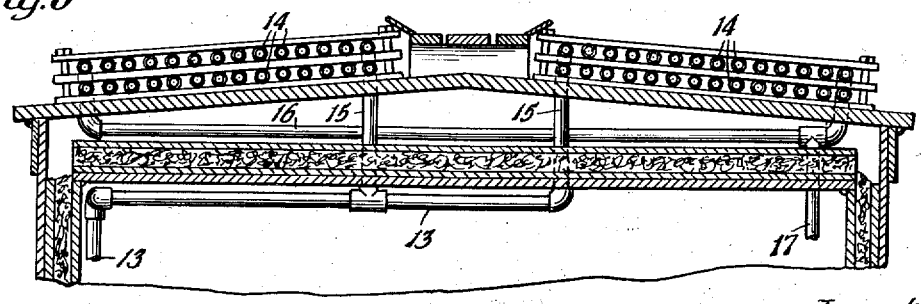
Figure 3:
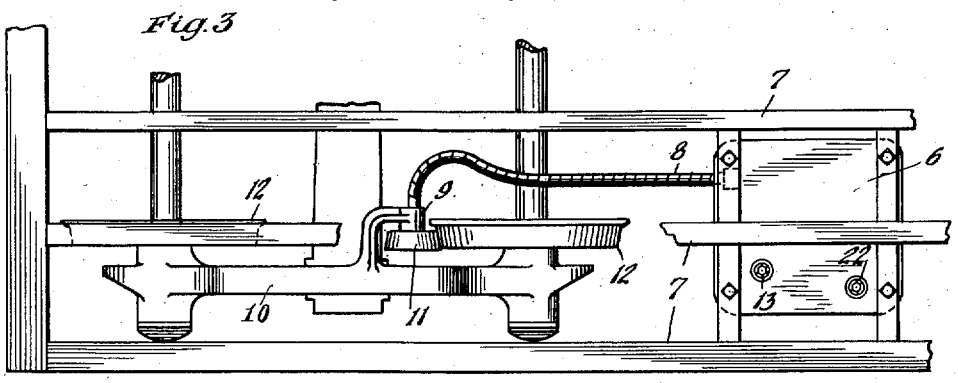
Figure 4:
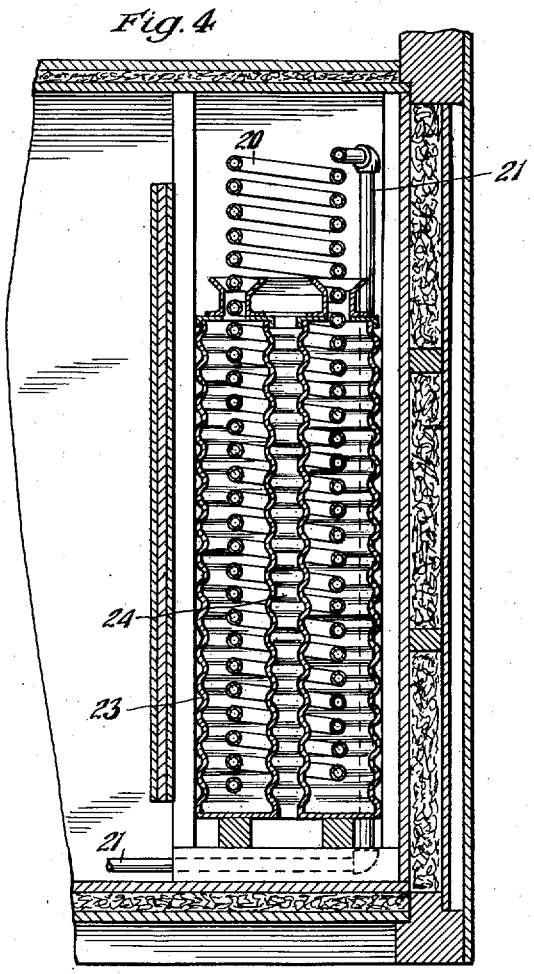

In the drawings, Figure 1 is a top view of the car, a part of the condenser coils and the roof of the car being broken away. Figure 2 is a partial vertical longitudinal section. Figure 3 is a partial top view of Figure 2. Figure 4 is a vertical section showing the brine tank containing the refrigerating coil and some pipe connections thereof. Figure 5 is a vertical cross section through a bulkhead of the car. And Figure 6 is a vertical cross section through the top portion of the car.

A compressor 6 of suitable construction is fastened underneath the underframe 7 of the car. It is to be understood, however, that the invention is not to be limited to this exact arrangement. The compressor 6 may be arranged on any suitable place on the car and such arrangement would still be within the spirit and the scope of the invention. In the specific embodiment illustrated, the compressor is driven by means of a flexible shaft 8 journaled at one end in the casing of the compressor 6 and at its other end in a bearing 9 fastened to the side frame 10 of the truck of the car. A friction wheel 11 is fastened to the end of the flexible shaft adjacent the bearing and is in permanent frictional contact with a car wheel 12. This contact will not be interrupted, when the car travels around a curve, because the truck moves as an integral unit, and the bearing 9 supporting the flexible shaft 8 is a fixed part of the truck.

From the compressor 6 a pipe 13 leads to the condenser coils 14. These condenser coils 14 are shown as arranged on the top of the car and this is the preferred arrangement. It is, however, to be understood, that the invention is not to be limited to this specific arrangement of the condenser coils, but that the latter may be disposed at any suitable place on the car, as long as the draft produced by the travel of the car is enabled to come into contact with substantially the entire surface of the pipes forming the condenser. Preferably the pipe 13 leading from the compressor 6 to the condenser 14 is connected with the latter by means of connecting pipes 15. Said connecting pipes communicate with the pipe of the condenser located adjacent the peak of the roof of the car, so that the condensed refrigerating medium will flow downwardly through the condenser pipes. The lowest part of said condenser 14 communicates with a pipe 16, which in turn is connected with a pipe 17 leading to a liquid receiver 18 located in one of the bulkheads of the car, as shown in Figure 5.

A pipe 19 leads from the liquid receiver 18 through an expansion or reducing valve 191 of any desired or well known construction, to the lower end of the refrigerator coil 20, and from the upper or outlet end of this coil a pipe 21 leads to a connecting pipe 22 communicating with the compressor.

The refrigerator coil 20 is disposed in a brine tank 23. The usual refrigerator cars are provided with two bulkheads, and it is preferred to arrange one brine tank with a refrigerator coil therein in each bunkhead as shown in Figure 1. The tank 23 is not fully as high as the refrigerating coil 20, so that the lower portion of the coil is surrounded by a weak brine solution, which will be frozen at times solidly under the influence of the refrigerating medium contained in the coil. The upper portion of the coil extends upwardly of the tank and will absorb heat directly from the air in the car. In order to provide the biggest possible cooling surface for cooling the air in the car, the wall of the brine is made of corrugated sheet metal, and in addition to that, an air shaft 24 is provided centrally of the tank and extending throughout the entire height of said tank. The coil 20 surrounds the wall of the air shaft 24. The direct cooling of the air in the car is therefore effected by the exposed coil surface and the surfaces of the brine tank.

The refrigerating medium travels from the liquid receiver 18 in liquid state, to the bottom of the refrigerating coil 20, where it will be gasified by the absorption of heat from the car; from the top of this coil to the compressor 6; and from there to the condenser coil 14, where it gives off all the heat absorbed from the air in the car and from the brine in the tanks 23 to the open atmosphere, whereupon it returns in liquid state to the liquid receiver.

As long as the car is in motion, the refrigerating medium will be kept in circulation, thereby cooling the car and causing the brine in the tanks to freeze solid.

Should the car for one reason or another be detached from the train and remain for a relatively long period of time on a siding remote from a station and any icing or stationary refrigerating facilities, the solid ice blocks formed by the brine will keep the car at the desired temperature.

What I claim as new and desire to secure by Letters Patent is:

1. In a refrigerator car of the class described, the combination of a bulkhead forming a part of the car, a brine tank located in said bulkhead, a central air shaft in said tank, a refrigerator coil arranged in the brine tank, surrounding the air shaft and partially extending outside of the tank, a compressor fastened on the outside of the car, a flexible shaft adapted to drive the compressor, a bracket fastened to one of the trucks of the car and supporting the free end of the flexible shaft, a friction wheel fastened to the end of the shaft adjacent the bracket and in permanent frictional contact with the running gear of the car, said compressor communicating with the outlet end of the refrigerating coil, a condenser located on top of the car and communicating with the compressor, and a liquid receiver arranged adjacent the brine tank and communicating with the intake end of the refrigerating coil and with the condenser.

2. In a refrigerator car having a bulkhead at one end thereof, the combination with a brine tank located between the bulkhead and car end; of a refrigerating coil partly submerged within said brine tank and partly exposed outside of said brine tank; a compressor rigidly secured to the car body on the outer side thereof; means adapted to be driven from the truck while the car is in motion for operating the compressor; a condenser coil disposed on the outside of the car; a liquid receiving tank disposed on the interior of the car; and pipe connections from the compressor to the condenser coil, from the condenser coil to the tank, from the tank to the refrigerating coil, and from the refrigerating coil to the compressor, whereby the exposed portions of the refrigerating coil are effective to refrigerate the air in the car while the latter is in motion and to simultaneously refrigerate the brine and render the latter available for refrigerating the air when the car is stationary.

3. In a refrigerator car having bulkheads at each end thereof, spaced from the respective end walls of the car, the combination with a brine tank in each of the spaces between the bulkheads and respective end walls; of a refrigerating coil associated with each brine tank, each said coil being disposed partly within the tank and extended partly outside of the tank, whereby the latter part of the coil is adapted to refrigerate the air within the car directly when the car is in motion and the immersed part of the coil is effective to store cold in the brine within the tank so as to be available when the car is stationary; of a compressor mounted on the underside of the car body adjacent a truck; means for operating said compressor from the truck when the car is in motion; a series of condenser coils disposed on top of the car roof; a liquid receiver disposed within the car body; and pipe connections from the compressor to the condenser coils, from the condenser coils to the receiver, from the receiver to the refrigerating coils and from the latter to the compressor.

4. In a refrigerator car having a bulkhead spaced from one end thereof, the combination with a brine tank in the space between said bulkhead and corresponding adjacent end; of a refrigerating coil disposed partly within and partly outside of said tank, whereby that part of the coil outside of the tank may be directly contacted by the air within the car and excess cold stored in the brine of the tank to be utilized when the car is stationary; a condenser coil disposed on the top of and extending lengthwise of the car roof; a liquid receiving tank located in the compartment between said bulkhead and car end; a compressor fixedly supported on the underside of the car; pipe connections from the compressor to the condenser coil, from the condenser coil to the liquid receiving tank, from the latter to the refrigerating coil and from the refrigerating coil to the compressor; and means, including a flexible connection, for operating the compressor from the truck while the car is in motion and in angularly adjusted positions of the truck.

5. In a refrigerator car having a bulkhead spaced from one end thereof, the combination with a brine tank in the space between said bulkhead and corresponding adjacent end; of refrigerating piping, part of said piping being immersed within the brine tank and part of said piping being disposed outside of the tank, so that the last named part of the piping is subject to direct contact with air circulating through the bulkhead space and the main portion of the car; a condenser in communication with said refrigerating piping; a compressor in communication with said refrigerating piping, said compressor being also connected with the condenser, whereby to form a circuit including the compressor, condenser and refrigerating piping; and mechanical power-transmitting means for directly operating the compressor, said means being operatively driven from one of the car trucks, said means being self-adjustable to turning movements of the truck whereby said means are operable when the car is in motion on both straight and curved track.

OTTO LUHR.